United States Patent
Maile

(10) Patent No.: US 10,506,816 B2
(45) Date of Patent: Dec. 17, 2019

(54) SCALABLE MACHINE

(75) Inventor: Bernd Maile, Oggelshausen (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 516 days.

(21) Appl. No.: 13/305,892

(22) Filed: Nov. 29, 2011

(65) Prior Publication Data

US 2012/0136460 A1    May 31, 2012

(30) Foreign Application Priority Data

Nov. 29, 2010 (EP) .................................. 10192860

(51) Int. Cl.
*A22C 11/02* (2006.01)
*A23B 4/03* (2006.01)
*G05B 19/04* (2006.01)
*A23B 4/044* (2006.01)
*G07C 9/00* (2006.01)
*G05B 19/042* (2006.01)

(52) U.S. Cl.
CPC .......... *A22C 11/0245* (2013.01); *A23B 4/031* (2013.01); *A23B 4/044* (2013.01); *G05B 19/042* (2013.01); *G05B 2219/24162* (2013.01); *G07C 9/00031* (2013.01)

(58) Field of Classification Search
USPC ......................................................... 700/19
See application file for complete search history.

(56) References Cited

U.S. PATENT DOCUMENTS

| 4,044,426 | A | * | 8/1977 | Kupcikevicius et al. ...... 452/31 |
| RE30,390 | E | * | 9/1980 | Kupcikevicius et al. ...... 452/31 |
| 4,431,159 | A | * | 2/1984 | Stubbs ...................... F16K 1/34 |
| | | | | 137/554 |
| 4,563,376 | A | * | 1/1986 | Hammer et al. ........... 138/118.1 |
| 4,594,274 | A | * | 6/1986 | De Jong et al. ............. 493/259 |
| 4,622,718 | A | * | 11/1986 | Glanz et al. ................... 452/29 |
| 4,624,873 | A | * | 11/1986 | De Jong et al. ............. 428/34.8 |

(Continued)

FOREIGN PATENT DOCUMENTS

| DE | 42 29 731 A1 | 4/1993 |
| DE | 100 15 893 A1 | 10/2001 |

(Continued)

OTHER PUBLICATIONS

Search Report EP10192860 dated Nov. 14, 2011.

(Continued)

*Primary Examiner* — Brian W Wathen
*Assistant Examiner* — Kelvin Booker
(74) *Attorney, Agent, or Firm* — Marshall, Gerstein & Borun LLP

(57) ABSTRACT

A food processing machine, such as a filling machine and/or twisting line for the manufacture of foods, particularly sausages, and a corresponding operating method, having at least one function module and at least one control section for controlling the corresponding function modules. Through at least one activation device, and after the input of an access authorization, at least one function module can be activated and/or one performance range from a plurality of possible performance ranges of at least one function module can be activated.

9 Claims, 3 Drawing Sheets

(56) References Cited

U.S. PATENT DOCUMENTS

| | | | | |
|---|---|---|---|---|
| 4,636,949 | A * | 1/1987 | Longabaugh | G05B 19/042 219/442 |
| 4,648,428 | A * | 3/1987 | Story | 138/118.1 |
| 4,688,298 | A * | 8/1987 | Mahoney et al. | 452/21 |
| 4,726,093 | A * | 2/1988 | Rogers | 99/384 |
| 4,727,624 | A * | 3/1988 | Stanley | 452/38 |
| 4,752,486 | A * | 6/1988 | Niedenthal et al. | 426/118 |
| 4,858,119 | A * | 8/1989 | Waugh | A47J 37/1219 219/492 |
| 4,913,038 | A * | 4/1990 | Burkett | A47J 37/1266 99/329 R |
| 5,051,562 | A * | 9/1991 | Bailey | A61F 7/0085 219/483 |
| 5,398,597 | A * | 3/1995 | Jones | A47J 37/1266 219/492 |
| 5,541,394 | A * | 7/1996 | Kouchi et al. | 235/375 |
| 5,659,624 | A * | 8/1997 | Fazzari et al. | 382/110 |
| 5,887,073 | A * | 3/1999 | Fazzari et al. | 382/110 |
| 6,004,488 | A * | 12/1999 | Farias | 264/37.2 |
| 6,056,109 | A * | 5/2000 | Hidai et al. | 198/431 |
| 6,135,869 | A * | 10/2000 | Schutz | 452/32 |
| 6,322,832 | B1 * | 11/2001 | Schiffmann | 426/246 |
| 6,326,039 | B1 * | 12/2001 | Schiffmann et al. | 426/238 |
| 6,374,984 | B1 * | 4/2002 | Nagler | B07C 5/361 177/1 |
| 6,466,971 | B1 * | 10/2002 | Humpleman et al. | 709/220 |
| 6,546,419 | B1 * | 4/2003 | Humpleman et al. | 709/223 |
| 6,903,310 | B1 * | 6/2005 | Lee et al. | 219/490 |
| 6,961,624 | B2 * | 11/2005 | Kirkpatrick et al. | 700/19 |
| 7,006,882 | B2 * | 2/2006 | Chang et al. | 700/96 |
| 7,035,693 | B2 * | 4/2006 | Cassiolato et al. | 700/1 |
| 7,228,186 | B2 * | 6/2007 | Karschnia et al. | 700/19 |
| RE40,029 | E * | 1/2008 | Schutz | 452/32 |
| 7,590,942 | B2 * | 9/2009 | Phillips et al. | 715/763 |
| 7,666,071 | B2 * | 2/2010 | Nakamura et al. | 452/36 |
| 7,813,822 | B1 * | 10/2010 | Hoffberg | 700/94 |
| 7,866,546 | B1 * | 1/2011 | Vance | G07G 1/14 235/379 |
| 7,930,261 | B2 * | 4/2011 | Baier et al. | 706/45 |
| 8,010,211 | B2 * | 8/2011 | Hendrickson et al. | 700/1 |
| 8,010,571 | B2 * | 8/2011 | Knoblock et al. | 707/792 |
| 8,032,232 | B2 * | 10/2011 | Bliss et al. | 700/18 |
| 8,082,576 | B2 * | 12/2011 | Flynn et al. | 726/5 |
| 8,264,318 | B2 * | 9/2012 | Ebrom et al. | 340/3.1 |
| 8,314,678 | B2 * | 11/2012 | Ebrom et al. | 340/3.1 |
| 8,555,356 | B2 * | 10/2013 | Flynn et al. | 726/5 |
| 2002/0026325 | A1 * | 2/2002 | Hirahara et al. | 705/1 |
| 2002/0072355 | A1 | 6/2002 | Jeong et al. | |
| 2003/0004655 | A1 | 1/2003 | Singh et al. | |
| 2003/0039724 | A1 * | 2/2003 | DuCharme et al. | 426/135 |
| 2003/0143295 | A1 * | 7/2003 | Howsam | A23J 3/227 425/71 |
| 2003/0171088 | A1 * | 9/2003 | Shefet | A22C 15/002 452/187 |
| 2003/0181996 | A1 * | 9/2003 | Kirkpatrick et al. | 700/19 |
| 2003/0211209 | A1 * | 11/2003 | Ekanayake et al. | 426/321 |
| 2004/0062888 | A1 * | 4/2004 | Cruz | A22C 13/0013 428/34.8 |
| 2004/0076736 | A1 | 4/2004 | Konanayakam et al. | |
| 2004/0080399 | A1 * | 4/2004 | Foster | G06Q 30/02 340/286.09 |
| 2004/0092220 | A1 * | 5/2004 | Rydenfors | A22C 13/023 452/32 |
| 2004/0100380 | A1 * | 5/2004 | Lindsay et al. | 340/540 |
| 2004/0116059 | A1 | 6/2004 | Cate et al. | |
| 2004/0143503 | A1 * | 7/2004 | Suthar | G06Q 30/06 705/15 |
| 2004/0158494 | A1 * | 8/2004 | Suthar | G06Q 30/06 705/15 |
| 2004/0202762 | A1 * | 10/2004 | DuCharme et al. | 426/534 |
| 2004/0225402 | A1 * | 11/2004 | Chang et al. | 700/121 |
| 2005/0053699 | A1 | 3/2005 | Whittlesey et al. | |
| 2005/0059414 | A1 * | 3/2005 | Mahmoodi | G06Q 30/02 455/456.2 |
| 2005/0247026 | A1 | 11/2005 | Griggs et al. | |
| 2005/0247213 | A1 * | 11/2005 | Slilaty | 99/485 |
| 2006/0026672 | A1 * | 2/2006 | Braun | G05B 19/042 726/9 |
| 2006/0030951 | A1 * | 2/2006 | Davlin et al. | 700/3 |
| 2006/0064201 | A1 * | 3/2006 | Chirnomas | 700/242 |
| 2006/0259160 | A1 * | 11/2006 | Hood et al. | 700/20 |
| 2007/0050053 | A1 * | 3/2007 | Cutler | 700/34 |
| 2007/0054013 | A1 * | 3/2007 | Schiffmann | 426/105 |
| 2007/0061209 | A1 * | 3/2007 | Jackson | G06Q 30/0603 705/15 |
| 2007/0093921 | A1 * | 4/2007 | Braun et al. | 700/83 |
| 2007/0093926 | A1 * | 4/2007 | D. Braun | G05B 19/042 700/112 |
| 2007/0148294 | A1 * | 6/2007 | DuCharme et al. | 426/135 |
| 2007/0175974 | A1 * | 8/2007 | Self et al. | 235/375 |
| 2007/0205258 | A1 * | 9/2007 | Self et al. | 235/375 |
| 2007/0222585 | A1 * | 9/2007 | Sabol et al. | 340/539.11 |
| 2008/0053042 | A1 | 3/2008 | Griggs et al. | |
| 2008/0145495 | A1 * | 6/2008 | Burroughs et al. | 426/277 |
| 2008/0311835 | A1 * | 12/2008 | Nakamura et al. | 452/33 |
| 2009/0029079 | A1 * | 1/2009 | Siddiqui et al. | 428/34.8 |
| 2009/0112346 | A1 * | 4/2009 | Tichatschke | 700/108 |
| 2009/0204492 | A1 * | 8/2009 | Scifo et al. | 705/14 |
| 2009/0275002 | A1 * | 11/2009 | Hoggle | 434/127 |
| 2009/0287837 | A1 * | 11/2009 | Felsher | 709/229 |
| 2010/0047400 | A1 * | 2/2010 | Carlson et al. | 426/92 |
| 2010/0071038 | A1 * | 3/2010 | Flynn et al. | 726/5 |
| 2010/0129505 | A1 * | 5/2010 | Hayes et al. | 426/250 |
| 2010/0159092 | A1 * | 6/2010 | Schiffmann | 426/315 |
| 2010/0241244 | A1 * | 9/2010 | Bliss et al. | 700/18 |
| 2010/0317420 | A1 * | 12/2010 | Hoffberg | 463/1 |
| 2011/0071651 | A1 * | 3/2011 | Law et al. | 700/11 |
| 2011/0117254 | A1 * | 5/2011 | Van De Nieuwelaar et al. | 426/277 |
| 2011/0139809 | A1 * | 6/2011 | Sawh | G07F 9/105 221/150 A |
| 2011/0171357 | A1 * | 7/2011 | Burroughs et al. | 426/383 |
| 2011/0187664 | A1 * | 8/2011 | Rinehart | G06F 3/041 345/173 |
| 2011/0250462 | A1 * | 10/2011 | Schiffmann | 428/474.4 |
| 2011/0278231 | A1 * | 11/2011 | Nishijima | 210/695 |
| 2011/0293862 | A1 * | 12/2011 | Schiffmann | 428/34.8 |
| 2012/0084843 | A1 * | 4/2012 | Hernoud et al. | 726/5 |
| 2012/0089467 | A1 * | 4/2012 | Comparelli | 705/16 |
| 2012/0089471 | A1 * | 4/2012 | Comparelli | 705/18 |
| 2012/0101972 | A1 * | 4/2012 | Cao | G06Q 10/087 706/47 |
| 2012/0109789 | A1 * | 5/2012 | Bhatt | G06Q 10/063 705/29 |
| 2012/0109842 | A1 * | 5/2012 | Bhatt | G06Q 10/0833 705/333 |
| 2012/0321752 | A1 * | 12/2012 | Van De Nieuwelaar et al. | 426/105 |
| 2012/0331537 | A1 * | 12/2012 | Flynn et al. | 726/7 |
| 2013/0024377 | A1 * | 1/2013 | Stong | 705/44 |
| 2013/0159021 | A1 * | 6/2013 | Felsher | 705/3 |
| 2013/0173484 | A1 * | 7/2013 | Wesby | 705/318 |

FOREIGN PATENT DOCUMENTS

| | | |
|---|---|---|
| DE | 10 2004 049 297 A1 | 4/2006 |
| DE | 10 2006 052 048 A1 | 5/2008 |
| DE | 10 2008 026 481 A1 | 12/2009 |
| DE | 10 2015 010 203 A1 | 2/2017 |
| EP | 0 636 962 A2 | 2/1995 |
| EP | 0 878 975 A2 | 11/1998 |
| EP | 0 885 565 B1 | 12/2002 |
| EP | 1 621 944 A2 | 2/2006 |
| EP | 1 196 838 B1 | 5/2006 |
| EP | 1 732 000 A2 | 12/2006 |
| EP | 1 829 451 B1 | 5/2008 |
| EP | 1997384 A1 | 12/2008 |
| EP | 2 457 444 A1 | 5/2012 |
| EP | 2 592 515 A2 | 5/2013 |
| EP | 0 767 426 B1 | 1/2014 |
| EP | 2 457 444 B1 | 4/2018 |

(56) References Cited

FOREIGN PATENT DOCUMENTS

| EP | 3 361 441 A1 | 8/2018 |
| WO | WO-96/00485 A2 | 1/1996 |
| WO | WO-2006001991 A1 | 1/2006 |

OTHER PUBLICATIONS

Search Report EP10192860 dated Jun. 8, 2011.
Borgeest, "Elektronik in der Fahrzeugtechnik: Hardware, Software, Systeme und Projektmanagement," Wiesbaden: Friedr. Vieweg & Sohn Verlag (2008).
Notice of Opposition for European Application No. 10192860.4, dated Feb. 5, 2019.
Preliminary Opinion dated Jul. 15, 2019 for EP Application No. 10192860.4., 14 pages.

* cited by examiner

SCALABLE MACHINE

CROSS-REFERENCE TO RELATED APPLICATION

The present application claims the benefit of priority of German Application No. 10 192860.4, filed Nov. 29, 2010. The entire text of the priority application is incorporated herein by reference in its entirety.

FIELD OF THE DISCLOSURE

The disclosure relates to a food processing machine as well as to a method for operating a corresponding food processing machine, such as in food manufacturing and food filling operations.

BACKGROUND

Food processing machines, such as filling machines that optionally have a twisting line or other auxiliary devices, are already well-known from the state of the art.

The machine manufacturers here develop particularly adapted machine types for each foreseeable application area. The customer then selects the required performance and the functional range that is expected to be required before making the decision to purchase a new food processing machine, such as a vacuum filler. After the customer has decided on a particular machine type, the performance and function range can no longer be changed once the machine has been delivered.

If the customer's choice later turns out to be incorrect, it can be that the selected machine no longer matches the new intended application as a result of altered requirements. Then the modification or replacement of the machine is the only possibility, which is always associated with a major effort and corresponding costs. This moreover represents a very inflexible and uneconomical solution to the problem. In addition, temporary expansions to the performance and/or function cannot be implemented on short notice in this way.

For the manufacturer, there is also the disadvantage that different system types must be developed and manufactured for the different intended applications, which is associated with high costs particularly during the manufacture, sale and maintenance.

BRIEF SUMMARY OF THE DISCLOSURE

On this basis, one aspect of the present disclosure is to provide a food processing machine and a corresponding operating method that make it possible to implement performance and/or function modifications on short notice in a simple manner with a minor effort.

According to the present disclosure, a food processing machine consequently has one or more function modules that are controlled by the corresponding control sections. According to the disclosure, it is now possible to offer a machine in a layout with reduced performance and/or function as a scalable machine. If there is a change in the requirement, additionally required function modules can be activated and/or one performance range from a plurality of possible performance ranges can be correspondingly activated in order, for example, to increase the performance. To accomplish this, an activation device (e.g., encoded activation module) is provided that, after the input of an access authorization, can be used to activate at least one corresponding function module and/or to increase a corresponding performance range. To be understood as "input of an access authorization" is, for example, the activation by means of the input of a corresponding code or the insertion of a corresponding prepaid card or a chip. The input of the access authorization can also take place by remote activation, e.g., after the bank transfer of a corresponding amount or by means of online activation, e.g., in connection with a credit card payment, online debit, payment in advance, payment systems, etc. The activation, i.e., the adaptation of the function or performance, can, for example, then be carried out by the customer or by service personnel at the site. It is also possible first to activate certain modules and performance ranges and then to register the modules and performance ranges actually used, e.g., online, and invoice them.

In this performance and function range that is then specified, the customer can then select the current parameters for operating the food processing machine for the customer's special process. The activation can also be for a restricted time, for example.

This results in the advantage that the customer can react flexibly to changed requirements, such as:

Temporary increase in performance, e.g., during the barbecue season, for Christmas production, for a one-time big order or in the event of a malfunction of another machine, etc.

Increase in performance for an unspecified time, for a general increase in the production capacity.

Bridging delivery bottlenecks of new machines by means of a temporary increase in performance for existing machines.

Temporary function expansions, e.g., for testing the manufacture of new or improved products by customers or for the production of seasonal products that cannot justify a general function expansion and particularly not a machine purchase.

General Function Expansions.

According to a preferred embodiment, the activation device is connected to at least one input unit (e.g., keyboard, plug-in unit for a chip or chip card or another data storage unit, data line, optical sensor, unit for voice recognition, etc.), by means of which an appropriate code, etc. as described earlier can be supplied. By means of this input device, it is consequently possible to input the access authorization and also the type and/or scope of the function or performance adaptation. The type and/or scope of the performance adaptation can also be conducted to the activation device or the corresponding control sections by means of a further input unit, e.g., a keyboard. The activation device is then connected to control sections for the corresponding function modules. The activation device can conduct signals, corresponding to an input regarding the requested performance and/or function adaptation, to the control sections, as a result of which the corresponding function module can be controlled or not controlled depending on a corresponding signal, and the corresponding function module can be operated in a particular performance range.

Either a plurality of selectable, previously selected performance ranges can thereby be specified in a memory, whereby then certain performance ranges can be activated, or the performance ranges can be activated in a continuously variable manner. Alternatively, the selected performance range can be conveyed to the controller or the control sections during the activation process.

For example, the activated performance range can be stored on the chip card and the controller can then fetch the value one time or continually without this value being stored in the controller.

In a machine with a reduced performance and/or function layout, it is advantageous if it is possible to limit the performance range of a corresponding function module to a maximum performance that lies below the maximally possible performance, that is to say, the maximally possible capacity utilization. The customer can then, depending on the requirement and financial possibilities, freely choose any performance or any performance range up to the maximally possible performance of the machine, as applicable, and consequently obtain the machine that is extremely flexibly individually adapted with respect to performance or price. Because the machine is designed for the maximum performance, the time-consuming generation of additional machine types is eliminated. There is consequently no need for additional documentation and no additional logistics or parts supply (many non-variable parts), machine storage, training efforts for mechanics, etc. As a result, a manufacturer's entire machine program or only a part thereof can be offered with reduced performance at a reduced price. The manufacturer can consequently react to customer requests simply, flexibly and economically, and, e.g., also act more purposefully in the competition with discounters.

Either a machine with the standard design can be offered in a layout with reduced performance or function, or there is also the possibility of designing the machine components in such a way during the development that different performance ranges and/or functions can be covered. For example, then a drive is installed that is standardly not fully used to capacity. At the time of delivery, then the performance that the customer actually requires can be activated. At any later time, the corresponding drive can also provide a performance greater than what was initially selected in the delivery condition. This procedure also allows many non-variable parts to be installed, with the known advantages.

The activation device or the control sections for different function modules can be designed in such a way that when the performance of one function module is limited, the performance range of other function modules is automatically limited and/or an increased performance range of one function module can only be activated if a correspondingly increased performance range of another function module or other function modules has also been activated. It is also possible to increase the performance of function modules (e.g., a grinder) without increasing the performance of other function modules (e.g., the conveyor).

This guarantees proper operation of the food processing machine. This can effectively prevent disturbances due to different performance ranges in different function modules.

The food processing machine is preferably a filling machine that optionally has a twisting line and/or a suspension unit and/or an inline grinder, etc. The food processing machine can thereby preferably have at least one of the following function modules: drive for the conveyor, drive for the conveyor curve, drive(s) for the twisting unit, inline grinder, squeezing unit, separating unit, for a transport unit, for a suspension device, vacuum pump for the filler, for the lifting device, ventilation and where applicable, further drives. It can be possible that at least one of the following function modules can be activated by means of the at least one activation device: drive of the conveyor curve, drive of the twisting unit, inline grinder driver, drive of the squeezing unit, drive of the separating unit, drive of the transport unit, drive of the suspension device, vacuum pump, drive of the lifting device and, where applicable, further drives. Preferably it can be possible to activate different performance ranges in at least one of the following function modules: drive of the conveyor, drive for the conveyor curve, drive of the twisting unit, drive of the inline grinder, drive of the squeezing unit, drive of the separating unit, drive of the transport unit, drive of the suspension device, vacuum pump, drive for the lifting device, ventilation, and, where applicable, further drives.

The activation device is preferably integrated into the controller with code input by means of a keyboard. The activation device can, for example, comprise at least one element of the following group: a software or hardware interlock, logic interconnections in a control circuit, a mechanical lock, an optical sensor for registering 2D or 3D codes.

BRIEF DESCRIPTION OF THE DRAWINGS

The present disclosure is explained in more detail in the following with reference to the following figures.

DETAILED DESCRIPTION OF THE PREFERRED EMBODIMENT

Figure 1:
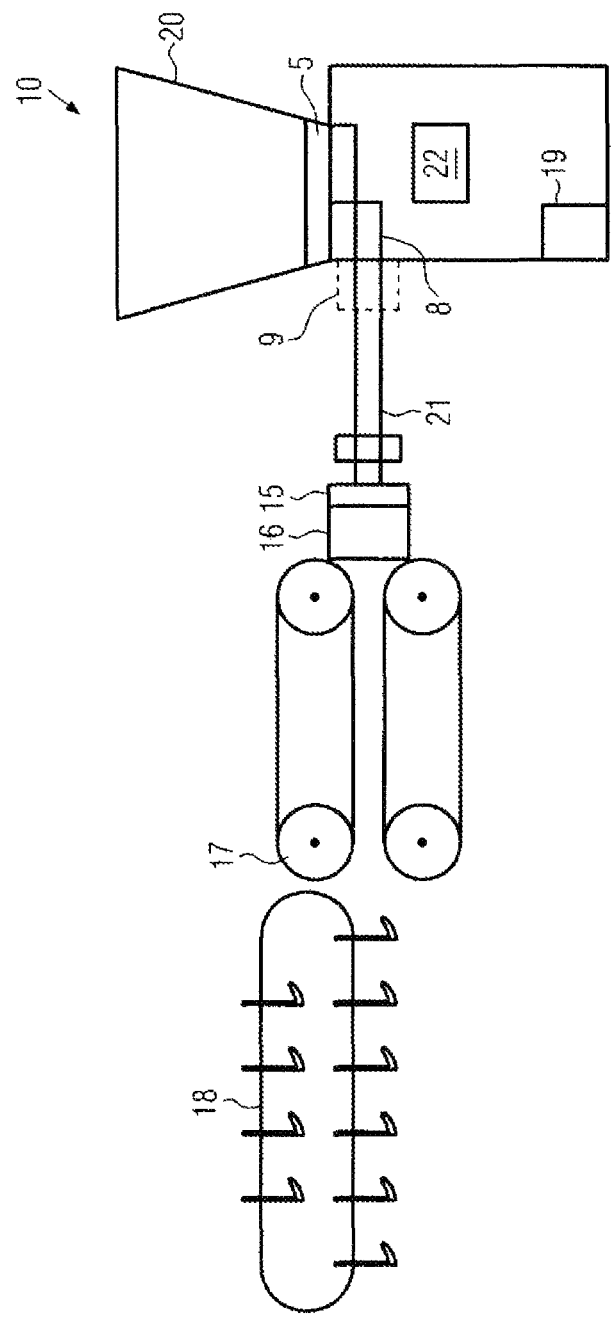
FIG. 1 shows a rough schematic of the configuration of a filling machine with a twisting line according to the present disclosure.

FIG. 1 is a rough schematic of a food processing machine according to the present disclosure, here a filling machine 10 with a twisting line added on. The filling machine is, e.g., a vacuum filling machine. For example, the filling machine has a hopper 20, by means of which the paste-like substance is supplied to a conveyor 5, for example, to a sliding-vane pump. A conveyor curve (not shown) can be arranged in the hopper for conveying the paste-like substance towards the conveyor. The conveyor curve has a drive. The conveyor 5 then pushes the paste-like substance into a sausage casing by means of a filling pipe 21. The conveyor 5 thereby comprises a corresponding drive. Finally, the filling machine can also have a vacuum pump 19, in order to generate negative pressure in the conveyor 5. The filling pipe 21 can preferably be driven around its longitudinal axis and has a corresponding drive 8 for this purpose. The sausages can consequently be twisted in the known manner. Finally, a filling machine can also optionally still have the inline grinder shown by 9 for reducing the filling substance to small pieces. The food processing machine can furthermore have a squeezing unit 15 that squeezes the paste-like goods into the sausage casing for creating the individual sausages. For example, two opposing dividing elements are thereby moved towards each other in order to constrict the filled sausage section. The squeezing unit 15 thereby has a corresponding drive. The device for cutting through the divided sausages can furthermore have a separating unit 16 that cuts the individual sausages apart and that likewise has a drive for the blade. A transport unit 17, e.g., here in the form of a longitudinal unit that has two opposing revolving transport means, is provided in the transport direction after the squeezing or separating unit. A suspension device 18 with a multitude of revolving hooks can be provided after the transport device in the transport direction, whereby the individual sausages or also the sausage chain can be suspended from this suspension device. FIG. 1 is only an example for a corresponding filling machine or a twisting line, whereby the configuration can vary greatly. For example, a filling machine can also have a lifting device and a fan with corresponding drive.

Figure 2:
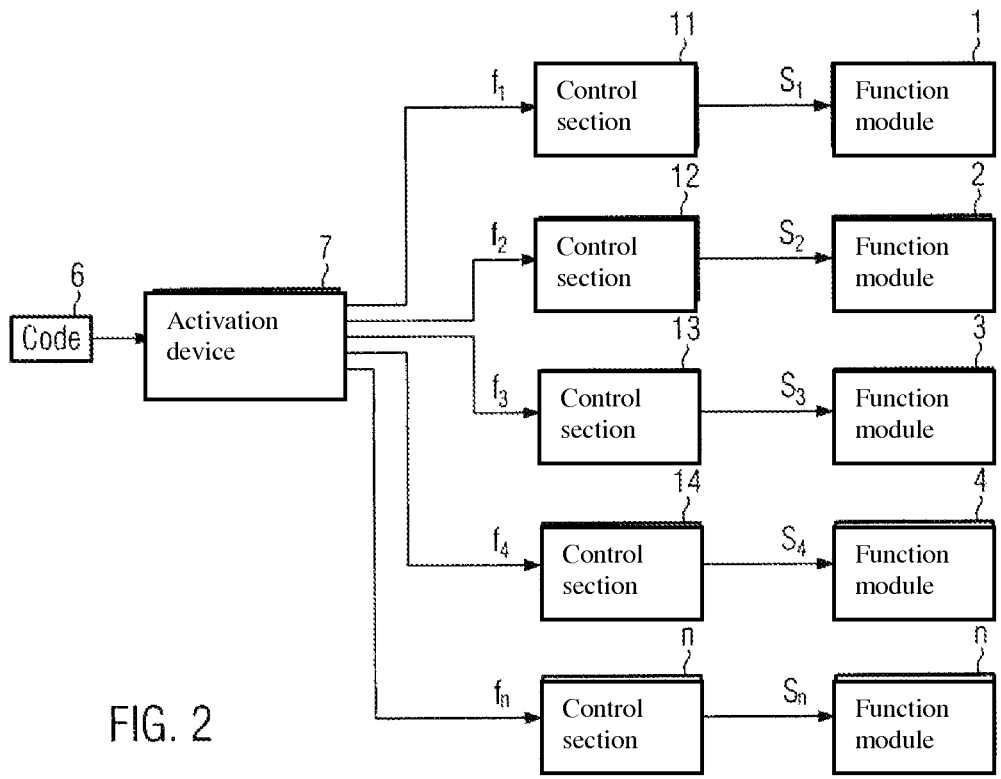
FIG. 2 schematically shows a block diagram according to the present disclosure.

Here the filling machine 10 is the actual main machine, and it comprises a controller 22 that has various control sections 11, 12, 13, 14, . . . (also refer to FIG. 2) for the different function modules 1, 2, 3, 4, n (FIG. 2). The function modules of the filling machine are here, e.g., the drive for the conveyor 5, drive for the conveyor curve, drives for the twisting unit, inline grinder, squeezing unit, separating unit, for the transport unit, for the suspension device, vacuum pump for the filler, for the lifting device, ventilation and, where applicable, other drives. It is possible that function modules in the form of different series connection units, such as ¬ twisting unit, inline grinder 9, squeezing unit 15, separating unit 16, transport unit 17, or suspension unit 18, lifting device, do not have their own separate controllers but instead are also controlled by the control sections in the controller 22 in the filling machine 10. The controllers 22 or the control sections can consequently be integrated in the machine, but they can also be arranged externally. In the case of a central controller unit, it can also be placed inside or outside a function module or the machine.

According to the present disclosure, the machine can, before it is delivered, consequently already be prepared in terms of hardware and software for a later performance and/or function expansion. The controller and/or software of the machine are thereby typically appropriately prepared.

Figure 3:
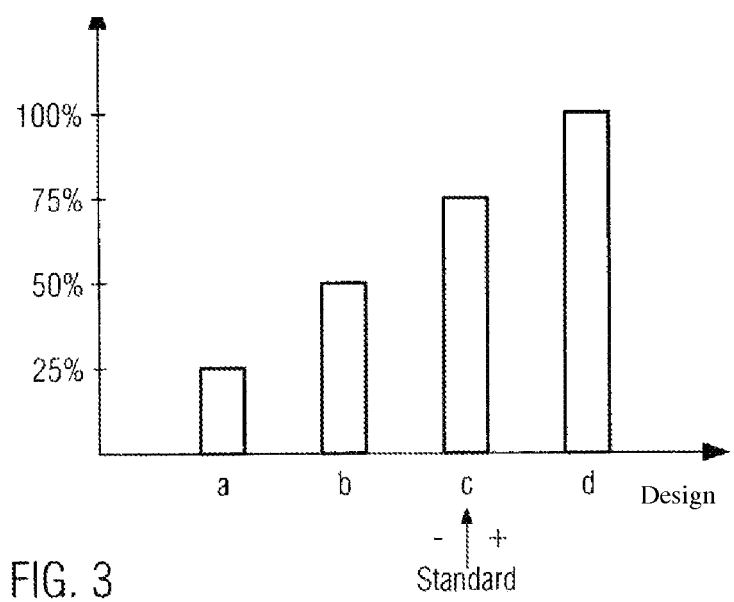
FIG. 3 shows a diagram with different performance ranges according to the present disclosure.

As particularly follows from FIG. 3, a function module has, for example, a maximally possible performance, i.e., the maximally possible capacity utilisation, of 100%. In the case of the conveyor, for example, the maximally possible performance is 500 l/min. It is also possible, however, to offer the food processing machine in a layout with reduced performance and/or function. This means, for example, that at the factory, the performance range a, b, c is limited to a maximum performance range that lies below the maximally possible performance d of the function module. As follows from FIG. 3, the performance can thereby be limited to 25%, 50% or 75%, for example. Higher performance ranges can then be activated as needed. For example, if the performance range was limited to the performance range c at the factory, the higher performance range d can be activated in exchange for payment if the customer needs it.

It is likewise possible that the device, when delivered, comprises function modules that are initially blocked. If the customer needs it, appropriate function modules can then be activated in exchange for payment.

For this purpose, the food processing machine according to the disclosure has, as particularly follows from FIG. 2, at least one activation device 7 by means of which at least one function module can be activated and/or a performance range a, b, c, d from a plurality of possible performance ranges of at least one function module 1, 2, 3, 4 can be activated after the input of an access authorization. The activation device 7 is preferably an activation module (performance and/or function limiter) that can be activated by means of a code. The activation device 7 thereby comprises, for example, a hardware or software interlock, logic interconnections in a switching device, a mechanical locking. The activation module 7 has an input device 6 by means of which a code can be input in order to carry out a function or performance adaptation. The function or performance adaptation can be carried out by the customer or by service personnel at the site. The code can be input by means of a corresponding input keyboard or by means of an insertable prepaid card or chip or chip card, an insertable storage medium, by means of remote activation, e.g., after the bank transfer of a corresponding amount, or by means of online activation, e.g., in connection with credit card payment, online processing, prepayment, payment systems, or by means of an optical sensor for registering 2D or 3D codes, etc. The manner and scope of the function or performance adaptation can take place either by means of the input device 6 and/or by means of a separate input device.

The activation device 7 is connected to the different control sections 11, 12, 13, 14, . . . for the corresponding function modules 1, 2, 3, 4, n, or is integrated into a control section or in the central controller. A corresponding signal f1, f2, f3, f4, fn is thereby conducted from the activation unit 7 to the individual control sections 11, 12, 13, 14, . . . . Control signals S1, S2, S3, S4, Sn corresponding to the signal f1, f2, f3, f4, fn are conducted to the function modules 1, 2, 3, 4, n so that these can be controlled and operated or also blocked, and can be operated in a particular performance range.

Protection against unauthorized performance or function adaptations is guaranteed by the input of an access authorization. A plurality of selectable performance ranges a, b, c, d can thereby be specified ahead of time in a memory and selected, or it is also possible to activate the performance ranges in a continuously variable manner.

For security reasons, it is advantageous if the activation device 7 or the control sections 11, 12, 13, 14, . . . for different function modules 1, 2, 3, 4, n are designed in such a way that in the case of the limitation of the performance of a function module 1, 2, 3, 4, n, the performance range of other function modules is automatically limited and/or an increased performance range of a function module 1, 2, 3, 4, n can only be activated if a correspondingly increased performance range of another function module or other function modules has also been activated. This means, for example, that the performance of the conveyor 5 can then only be increased if the drive for the twisting unit 8 also has a corresponding performance or the performance of the drive of the conveyor curve in the filling hopper has a corresponding performance.

It is also possible that there is a plurality of activation devices 7 for different control sections.

The activation device 7 is preferably integrated into the controller 22 of the machine, here the filling machine 10. Alternatively, the activation device can also be located, e.g., in line applications, in an attachment, for example, in a twisting line, a clip machine, etc., that is then connected in turn to the control section for the respective module, whereby this control section can then in turn be integrated in the controller 22 of the filling machine. The activation device can, however, also forward the information regarding the authorized, i.e., e.g., the purchased, performance and/or function scope to a central computer. In this way, it is ensured that the attachment is also only operated in the authorized range by the central controller. This central control device does not have to be integrated in the filling machine, and can instead also be executed as a separate controller. Control from a control panel is also possible.

One possibility lies in offering a machine with a standard design in a layout with reduced performance and/or function. The customer can freely select any given performance up to the maximally possible performance of the machine depending on the requirement and financial possibilities, and consequently obtain a machine that is very flexibly individually adapted with regard to its performance or price. Because the machines are designed for the maximal performance, the time-consuming generation of additional machine types is eliminated. There is no need for additional documentation and no additional logistics or parts supply (of the non-variable parts), machine storage, training efforts for mechanics, etc. As a result, e.g., a manufacturer's entire machine program or only a part thereof can be offered, for example, with reduced performance at a reduced price. The manufacturer can consequently react to customer requests simply, flexibly and economically, and, e.g., also act more purposefully in the competition with discounters.

A further possibility lies in designing the machine components during the development in such a way that they can cover various performance ranges and/or functions. For example, a drive is installed that is standardly not fully used to capacity. At the time of delivery, the performance that the customer actually requires can then be activated. At any later time, the corresponding drive can, if needed, provide a performance greater than what was initially selected in the delivery condition. This procedure also allows many non-variable parts to be installed, with the known advantages.

Figure 4:
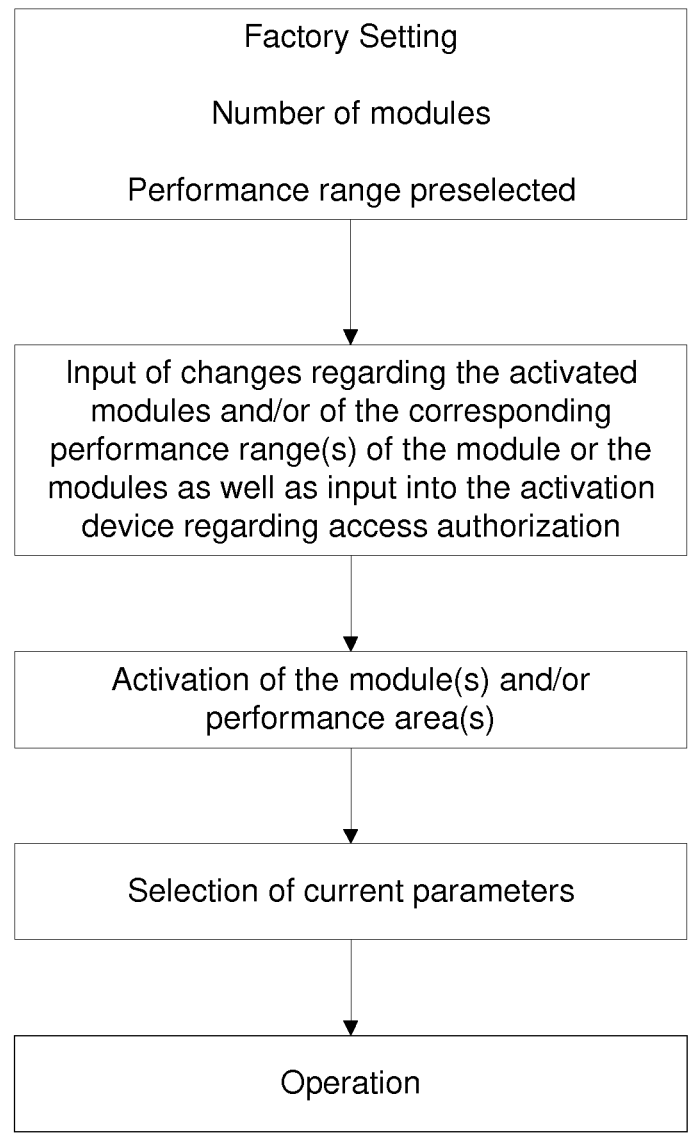
FIG. 4 shows a rough schematic of the sequence of the method according to the disclosure.

FIG. 4 shows an operating method according to the disclosure. When a system is sold, the system has a factory setting in which the number of modules that are activated and the corresponding performance ranges a, b, c, d are preselected.

If needed, the number of activated modules can now be expanded, at least for a time, and the performance ranges of a module or of a plurality of modules can be increased. For this purpose, a corresponding access authorization, for example, in the form of a code, is input into the activation device 7. The input contains information regarding the function and performance adaptation for certain function modules. If this information is not yet contained in the input, an input with the required changes can also be carried out separately (also by means of a different input device).

Depending on the input, now certain modules can be activated and/or certain performance ranges can be increased. If the corresponding activated modules are defined and the performance ranges have been activated, the current parameters for the operation can be selected and the operation can take place. The payment preferably is made before the activation. It is also possible first to activate certain modules and performance ranges and then to register the modules and performance ranges actually used, for example, online, and then invoice them. It is also possible to provide all modules and performance ranges and then provide a device that registers the function modules used and their performance ranges. These data are sent to the manufacturer, e.g., online, by means of a data connection and they can then be invoiced.

The invention claimed is:

1. A scalable food processing machine for manufacturing foods, comprising:
   one or more function modules, which comprises operational machine components of the food processing machine, wherein a layout of the one or more function modules is limited to a maximum performance range which is a reduced performance capability of the one or more function modules such that the maximum performance range lies below the maximally possible performance range of the one or more function modules;
   one or more control sections, of a controller, wherein each control section is connected to a corresponding function module of the one or more of the function modules for controlling the corresponding function modules within the maximum performance range which is at the reduced performance capability of the one or more function modules;
   an activation device is connected to the one or more control sections wherein the activation device is activated with an access code such that with the activation activated, the activation device is capable of providing a control signal to the one or more of the control sections wherein:
      the one or more control sections are capable of providing a corresponding control signal to the one or more function modules to alter the maximum performance range of the of the one or more function modules to a different performance range than the maximum performance range which is at the reduced performance capability of the one or more function modules; and
      the one or more control sections are capable of operating the one or more function modules within the different performance range; and
   a registering device associated with the food processing machine that registers use and performance of the corresponding function module for sending to a manufacturer to invoice a user of the food processing machine.

2. The food processing machine according to claim 1, wherein the activation device is connected to an input unit and is connected to the control sections and can conduct a signal corresponding to an input to a control section of a function module, as a result of which, depending on the signal the function module can be one of controlled, not controlled, operated in a performance range, and a combination thereof.

3. The food processing machine according to claim 1, wherein a plurality of selectable performance ranges are specified in a memory and can be activated or the selected performance range is conveyed to the control section or sections during the activation process.

4. The food processing machine according to claim 1, wherein the activation device comprises one of a hardware interlock, a software interlock, logic interconnections in a switching device, a mechanical lock, an optical sensor for registering 2D or 3D codes, and a combination thereof.

5. The food processing machine according to claim 1, wherein at least one of the control sections and the at least one activation device for at least one of the function modules is designed in such a way that one of:
   when the performance of a function module is limited, the performance range of at least one other function module is automatically limited; and
   an increased performance range of at least one function module can only be activated if a correspondingly increased performance range of another function module or other function modules has been activated, and a combination thereof.

6. The food processing machine according to claim 1, wherein the food processing machine has at least one of the following function modules: a drive for the conveyor, a drive for the conveyor curve, a drive for the twisting unit, a drive for the inline grinder, a drive for the squeezing unit, a drive for the separating unit, a drive for a transport unit, a drive for the suspension device, a vacuum pump for the filler, a drive for the lifting device, a ventilation drive, and wherein one of
   at least one of the following function modules can be activated by means of the at least one activation device: the drive of the conveyor curve, the drive of the twisting unit, the inline grinder drive, the drive of the squeezing unit, the drive of the separating unit, the drive of the transport unit, the drive of the suspension device, the vacuum pump, the drive of the lifting device, the ventilation drive; and different performance ranges of at least one of the following function modules can be activated: the drive for the conveyor, the drive of the conveyor curve, the drive of the twisting unit, the drive of the inline grinder, the drive of the squeezing unit, the drive of the separating unit, the drive of the transport unit, the drive of the suspension device, the vacuum pump, the drive of the lifting device, the ventilation drive, and a combination thereof.

7. A scalable food processing machine for manufacturing foods, comprising:

one or more function modules, which comprises operational machine components of the food processing machine, wherein a layout of the one or more function modules is limited to a maximum performance range which is at a reduced performance capability of the one or more function modules such that the maximum performance range lies below the maximally possible performance range of the one or more function modules;

one or more control sections, of a controller, wherein each control section is connected to a corresponding function module of the one or more of the function modules for controlling the corresponding function modules within the maximum performance range which is at the reduced performance capability of the one or more function modules;

an activation device is connected to the one or more control sections wherein the activation device is activated with an access code such that;

with the activation device activated, the activation device is capable of providing a control signal to the one or more of the control sections wherein:

the one or more control sections are capable of providing a corresponding control signal to one or more function modules to alter the maximum performance range of the one or more function modules to a different performance range selected from a plurality of possible performance ranges which differ from the maximum performance range which is at the reduced performance capability of the one or more function modules; and the one or more control sections are capable of operating the the one or more function modules within the different performance range; and a registering device associated with the food processing machine that registers use and performance data of the corresponding function module for sending to a manufacturer to invoice a user of the food processing machine.

8. A scalable food processing machine for manufacturing foods, comprising:

one or more function modules, which comprises operational machine components of the food processing machine, such that a layout of the one or more function modules is limited to a maximum performance range which is a reduced performance capability of the one or more function modules such that the maximum performance range lies below the maximally possible performance range of the one or more function modules;

one or more control sections, of a controller, wherein each control section is connected to a corresponding function module of the one or more of the function modules for controlling the corresponding function module within the maximum performance range which is at the reduced performance capability of the one or more function modules; wherein:

a different performance range can be activated and change the maximum performance range which is at the reduced performance capability range by at least one activation device activated by an access code;

the activation device is connected to the one or more control sections;

with access code activating the activation device the activation device is capable of providing a control signal to the one or more of the control sections; and the one or more control sections are capable of operating the one or more function modules to have the different performance range and of controlling the one or more function modules within the different performance range.

9. The scalable food processing machine for manufacturing foods of claim 8, further including a registering device associated with the food processing machine that registers use and performance data of one or more function modules for sending to a manufacturer to invoice a user of the food processing machine.

* * * * *